United States Patent
Broughton

(10) Patent No.: US 7,384,439 B2
(45) Date of Patent: Jun. 10, 2008

(54) VENTS FOR FLUID SYSTEMS

(75) Inventor: John L Broughton, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/652,126

(22) Filed: Jan. 11, 2007

(65) Prior Publication Data
US 2007/0157587 A1 Jul. 12, 2007

Related U.S. Application Data

(63) Continuation of application No. 11/178,325, filed on Jul. 12, 2005, now abandoned, which is a continuation of application No. 10/619,145, filed on Jul. 15, 2003, now abandoned.

(30) Foreign Application Priority Data
Aug. 13, 2002 (GB) .................................. 0218777.1

(51) Int. Cl.
B01D 45/12 (2006.01)
(52) U.S. Cl. .................... 55/345; 55/458; 55/459.1; 55/460; 55/485
(58) Field of Classification Search ................. 55/458, 55/460, 459.1–459.5, 345, 485, 385.3
See application file for complete search history.

(56) References Cited

U.S. PATENT DOCUMENTS

| | | | | |
|---|---|---|---|---|
| 4,131,134 A | * | 12/1978 | Lindberg | .................... 137/808 |
| 4,269,607 A | * | 5/1981 | Walker | ......................... 95/271 |
| 4,433,539 A | * | 2/1984 | Norris et al. | .............. 60/39.08 |
| 5,042,998 A | * | 8/1991 | Beusen | ......................... 55/338 |
| 5,059,226 A | * | 10/1991 | Schneider et al. | ......... 55/459.1 |
| 6,228,151 B1 | * | 5/2001 | Conrad et al. | ................ 95/271 |
| 6,348,087 B1 | * | 2/2002 | Aslin | .......................... 96/210 |

FOREIGN PATENT DOCUMENTS

| | | | | |
|---|---|---|---|---|
| EP | 0392713 A | * | 10/1990 | |
| GB | 2084266 A | * | 4/1982 | |
| GB | 2108714 A | * | 5/1983 | |
| JP | 9303130 A | * | 11/1997 | |

* cited by examiner

Primary Examiner—Richard L Chiesa
(74) Attorney, Agent, or Firm—W. Warren Taltavull; Manelli Denison & Selter PLLC

(57) ABSTRACT

A vent for a fluid system includes a chamber through which fluid can flow along either a first flow path or a second flow path, in which the resistance to fluid flow is relatively high when the fluid follows the first flow path and relatively low when the fluid follows the second flow path. In a preferred embodiment the chamber is substantially cylindrical and has two ports, one of which is substantially coaxial with the chamber and the other of which is substantially tangential to the chamber. The fluid flow, at least when flowing the first flow path, may include a component of higher density than the fluid, and the flow of fluid along the first flow path may act to separate the higher density component from the fluid.

12 Claims, 3 Drawing Sheets

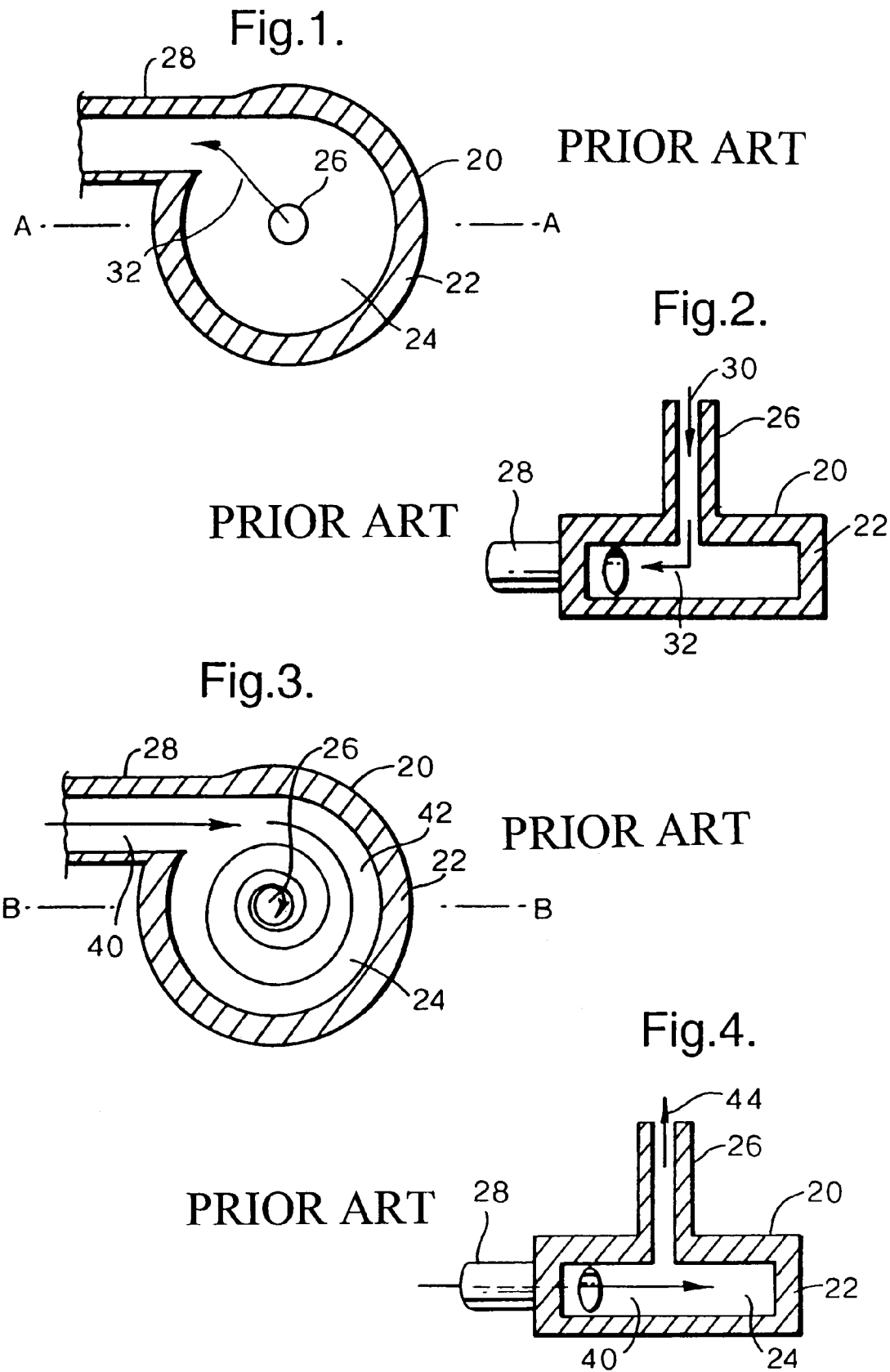

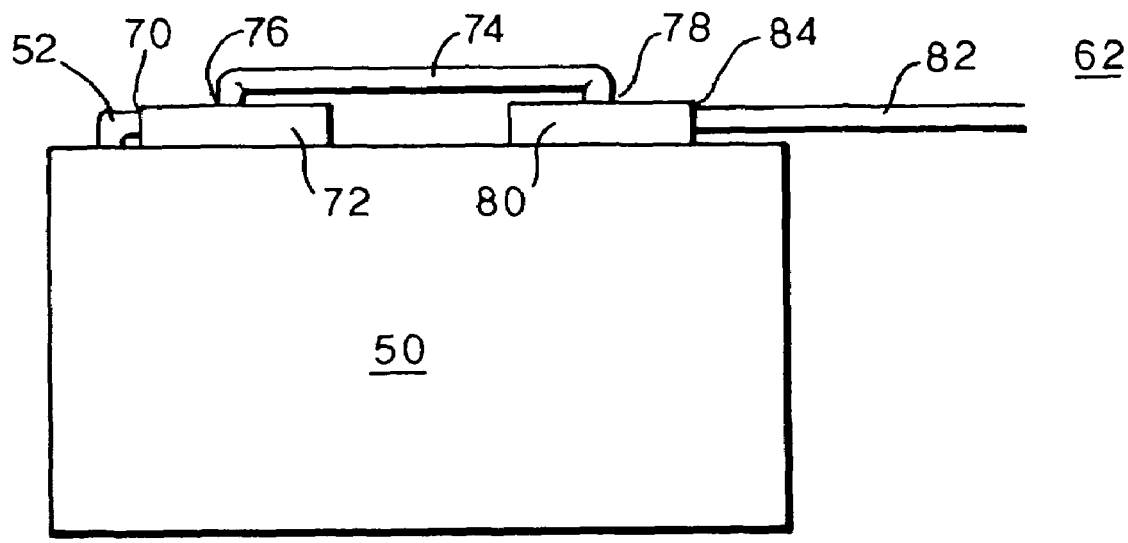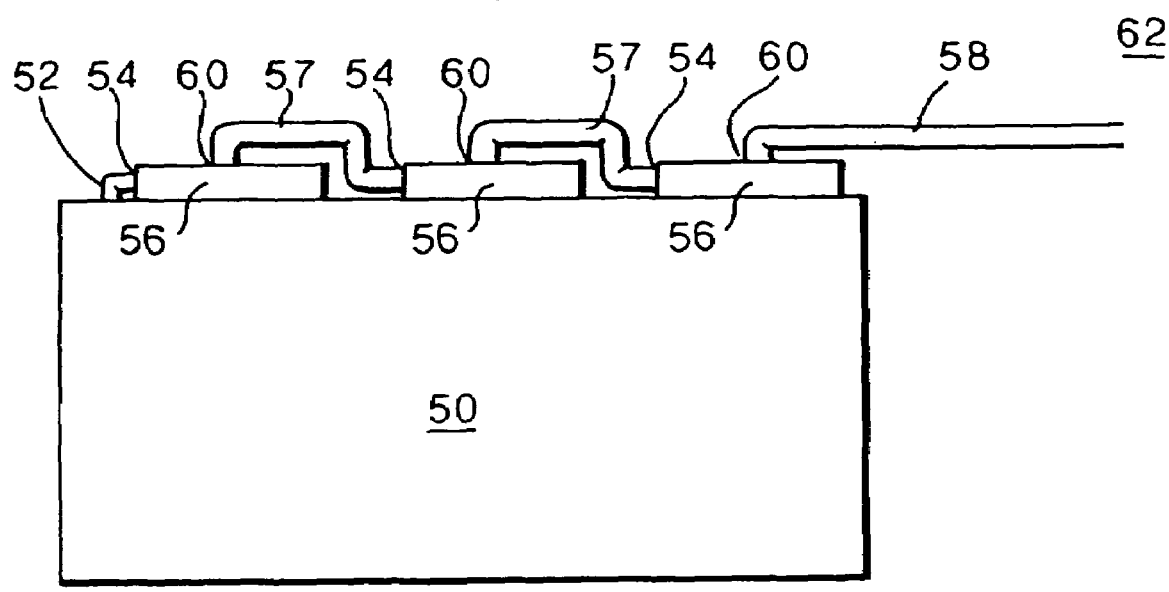

VENTS FOR FLUID SYSTEMS

This application is a continuation of National application Ser. No. 11/178,325 filed Jul. 12, 2005, and now abandoned, wherein the aforesaid application is a continuation application of National application Ser. No. 10/619,145 filed Jul. 15, 2003 and now abandoned.

FIELD OF THE INVENTION

This invention relates to vents for fluid systems. More particularly, but not exclusively, it relates to vents for bearing chambers, for example in gas turbine engines.

BACKGROUND OF THE INVENTION

Gas turbine engines typically include one or more shafts supported on oil-lubricated bearings. These bearings are housed in bearing chambers, and there are seals between the chamber and the shaft to inhibit the leakage of lubricating oil. It is usually arranged that, under normal operating conditions, the pressure outside a bearing chamber is slightly higher than the pressure within it. This differential pressure ensures that there is a continuous counterflow of air inwards through the seals and oil leakage is avoided. However, under certain transient conditions the pressures may change so that the differential pressure is reversed. In these circumstances, oil will tend to pass through the seals and out of the bearing chamber.

Various types of sealing arrangement are known that attempt to prevent oil leakage. Labyrinth seals generally require a large and heavy buffer system to operate properly; some such systems also incorporate drains to dispose of any oil that does leak, adding further weight and complexity. Carbon seals can operate with a smaller counterflow of air, which may save weight in the buffer system, but they are still prone to allow oil to escape if the differential pressure is reversed.

A separate vent may be provided for the bearing chamber, to allow an outward flow of air, when required, other than through the bearing chamber seals. Examples of such devices are simple vents, with or without restrictors, and spring-loaded valves; but oil can still escape from the bearing chamber through these devices, and so they do not solve the fundamental problem.

Any oil that does leak out of a bearing chamber may contaminate the core air flow of the engine. When gas turbine engines are installed in aircraft, typically a proportion of the core air flow is taken to supply breathable air for the crew and passengers. The "cabin odour" arising out of this sort of contamination has long been recognised as undesirable. However, in recent years it has become increasingly clear that contaminated cabin air may also represent a serious health and safety hazard.

SUMMARY OF THE INVENTION

It is therefore an object of the present invention to provide a simple and compact vent, which will allow air to flow both into and out of the bearing chamber, but which will substantially prevent the leakage of oil from the bearing chamber.

According to one aspect of this invention, a vent for a fluid system includes a chamber through which fluid can flow along either a first flow path or a second flow path, in which the resistance to fluid flow is relatively high when the fluid follows the first flow path and the resistance to fluid flow is relatively low when the fluid follows the second flow path.

Preferably the first flow path is associated with fluid flow in one direction through the chamber, and the second flow path is associated with fluid flow in the opposite direction through the chamber.

Preferably the chamber has two ports, the two ports lying in planes substantially perpendicular to each other.

In a particular preferred embodiment of this aspect of the invention, the chamber is substantially cylindrical. Preferably, one of the two ports is arranged to be substantially coaxial with the chamber and the other of the two ports is arranged to be substantially tangential to the chamber.

The substantially tangential port may have a convergent or convergent-divergent inner profile.

An annular wall member may protrude generally axially from the coaxial port into the chamber.

The fluid flow, at least when following the first flow path, may include a component of higher density than the fluid, and the flow of the fluid along the first flow path may act to separate the higher density component from the fluid. The chamber may be extended in an axial direction to receive the higher density component separated from the fluid. Means may be provided to carry the higher density component out of the chamber.

The higher density component may comprise a lubricant.

The vent may be a part of a bearing chamber. The vent may be a part of a gas turbine engine.

According to an alternative aspect of the invention, a venting arrangement for a fluid system comprises a first vent and a second vent, the first and second vents being arranged in flow series, in which the first and second vents are so arranged that when fluid flows through the venting arrangement in one direction it follows the first flow path through the chamber of the first vent, and when fluid flows through the venting arrangement in the other, opposite direction it follows the first flow path through the chamber of the second vent.

According to a further alternative aspect of the invention, a venting arrangement for a fluid system comprises a plurality of vents, the vents being arranged in flow series, in which the vents are so arranged that when fluid flows through the venting arrangement in one direction it follows the first flow path through the chamber of each vent in succession, and when fluid flows through the venting arrangement in the other, opposite direction it follows the second flow path through the chamber of each vent in succession.

The venting arrangement may be a part of a bearing chamber. The venting arrangement may be a part of a gas turbine engine.

The preferred embodiments of all the aspects of the invention described in this specification use a device, known as a vortex throttle or vortex diode, which is well known in the art of fluidics. This device will be described in more detail later in the specification. Those skilled in the art of fluidics will be aware of the distinctions between a vortex throttle and a vortex diode; for the purposes of this specification such distinctions are generally unimportant and for the sake of clarity the term "vortex diode" will be used throughout.

Fluidics is a discipline whose origins lie in attempts to overcome the susceptibility of electronic circuits to interference from electromagnetic radiation. It teaches the construction of circuits, analogous to electrical or electronic circuits, in which a flow of fluid, rather than a flow of electrons, performs the work. Devices such as switches, diodes, amplifiers and so on, familiar in an electrical context, can also be made to work satisfactorily in fluidic circuits. Fluidics has received relatively little attention in recent years, although its principles have been applied (on a larger scale) in fields such as sewage flow control, where the absence of moving parts in fluidic components permits the construction of reliable valves that are not prone to blockage.

BRIEF DESCRIPTION OF THE DRAWINGS

Certain embodiments of the invention will now be described, by way of example only, with reference to the accompanying drawings in which:

FIG. 1 is a schematic sectional view of a vortex diode of known type, showing the air flows in the "low resistance" direction;

FIG. 2 is a schematic sectional view taken on the line A-A in FIG. 1;

FIG. 3 is a schematic sectional view of a vortex diode of known type, showing the air flows in the "high resistance" direction;

FIG. 4 is a schematic sectional view taken on the line B-B in FIG. 3;

FIG. 9 is a schematic representation of a bearing chamber having a venting arrangement according to an alternative aspect of the invention;

FIG. 10 is a schematic representation of a bearing chamber having a venting arrangement according to a further alternative aspect of the invention.

DETAILED DESCRIPTION OF THE INVENTION

Figure 5:
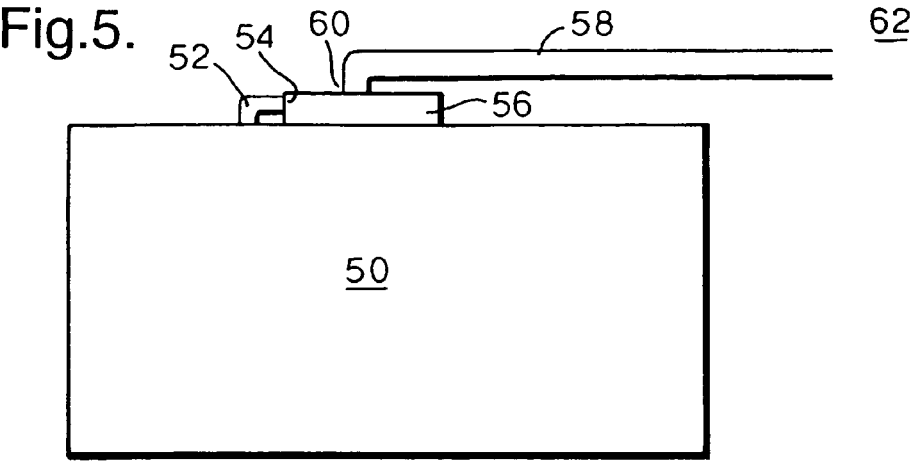
FIG. 5 is a schematic representation of a bearing chamber having a vent according to one aspect of the invention.

Referring first to FIGS. 1 and 2, a vortex diode 20 of known type comprises structure 22 defining a cylindrical volume 24. Two ducts of circular cross-section are in fluid communication with the cylindrical volume 24. Duct 26 is coaxial with the cylindrical volume 24 and duct 28 is tangential to the cylindrical volume 24.

When fluid flows into the cylindrical volume 24 through the duct 26, as shown by the arrow 30 in FIG. 2, it will tend to flow substantially in the manner indicated by the arrows 32 so as to exit the cylindrical volume 24 via the duct 28, and the resistance to flow will be relatively low.

Referring now to FIGS. 3 and 4, the arrangement of the vortex diode 20 is exactly as in FIGS. 1 and 2. When fluid flows into the cylindrical volume 24 through the duct 28, as shown by the arrows 40, the geometry of the cylindrical volume 24 will tend to urge the fluid into vortical flow, as shown by the arrow 42 in FIG. 3. The fluid will then exit the cylindrical volume 24 via the duct 26 (as shown by the arrow 44 in FIG. 4), but because of the swirling motion imparted to the flowing fluid the resistance to flow will be relatively high. Furthermore, any higher density component entrained in the fluid will tend to be urged outwards by centrifugal force, and will tend to be separated from the fluid.

The duct 28 may have an inner profile that converges towards the cylindrical volume 24, or may have an inner profile that is convergent-divergent. When fluid flows into the cylindrical volume 24 through the duct 28, as shown in FIGS. 3 and 4, such an inner profile will increase the velocity of the fluid flowing into the cylindrical volume 24, for a given pressure drop, and thus increase the efficiency of the separation.

FIG. 5 shows a schematic sectional view of a bearing chamber 50 of a gas turbine engine (not shown having a vent according to one aspect of the invention. Conduit 52 links the bearing chamber 50 to the tangential port 54 of a vortex diode 56 of known type. Conduit 58 links the coaxial port 60 of the vortex diode 56 to a region 62 outside the bearing chamber 50.

The vent is shown attached to the side of the bearing chamber. However, it is envisaged that it could equally well be integrated into the structure of the bearing chamber, or alternatively be entirely separate from the bearing chamber and mounted separately within the engine.

In normal operation, the pressure in the bearing chamber 50 will be lower than the pressure in the region 62 outside the bearing chamber 50, and so there will be a flow of air from the region 62 into the bearing chamber 50. Air will therefore flow into the vortex diode 56 through the coaxial port 60, and out through the tangential port 54. The air flow through the vortex diode 56 will therefore be substantially as shown by the arrows 30 and 32 in FIGS. 1 and 2, and the resistance to flow will be relatively low.

It is possible, under certain operating conditions of the gas turbine engine, that the relative pressures in the engine may change such that the pressure in the bearing chamber 50 is higher than the pressure in the region 62. There will then be a flow of air from the bearing chamber 50 into the region 62. Air will therefore flow into the vortex diode 56 through the tangential port 54, and out through the coaxial port 60. The air flow through the vortex diode 56 will therefore be substantially as shown by the arrows 40, 42 and 44 in FIGS. 3 and 4, and the resistance to flow will be relatively high. It is likely that some oil or similar lubricant will be entrained in the air flow, and (as explained in the discussion of FIGS. 3 and 4) the swirling motion imparted to the air will tend to urge any such component outwards by centrifugal force, and will thus tend to separate it from the air.

Figure 6:
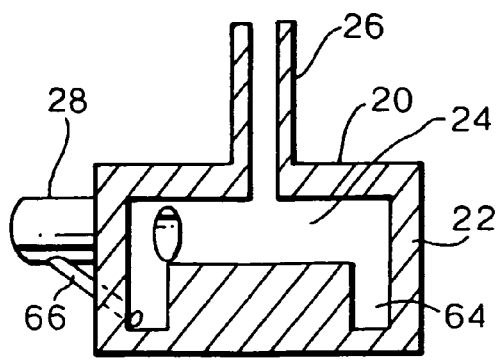
FIGS. 6 and 7 are schematic sectional views of two alternative embodiments of a bearing chamber vent according to one aspect of the invention.
Figure 7:
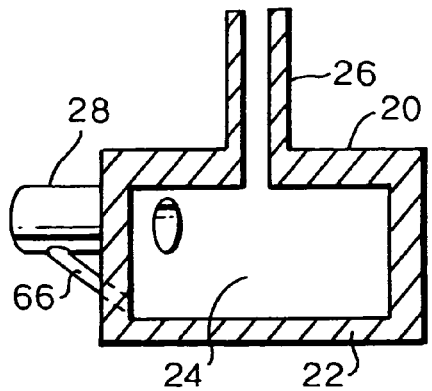

FIGS. 6 and 7 show two alternative embodiments of the vortex diode used in the vent of FIG. 5, in which provision is made to collect oil separated out from the air flow. In the embodiment of FIG. 6 the cylindrical volume 24 is extended downward by the addition of an annular volume 64. In FIG. 7, the whole of the cylindrical volume 24 is enlarged downward. In use, under the abnormal conditions described earlier when the air flow is as shown in FIGS. 3 and 4, any oil separated out from the air flow will collect in the annular volume 64 (of FIG. 6) or in the lower part of the enlarged cylindrical volume 24 (of FIG. 7). Subsequently, when the air flow returns to normal, as shown in FIGS. 1 and 2, the separated oil can flow through the conduit 66 back into the duct 28 and subsequently back to the bearing chamber, impelled by the normal flow of air out of the vortex diode 20 through the duct 28 (as shown by arrow 32 in FIG. 1). The conduits 66 and 28 may be arranged so that the separated oil will tend to flow back to the bearing chamber under the action of gravity.

Figure 8:
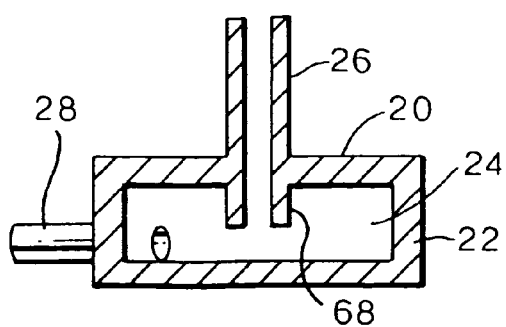
FIG. 8 is a schematic sectional view of a further alternative embodiment of a bearing chamber vent according to one aspect of the invention.

FIG. 8 shows an alternative embodiment of a vortex diode having a higher resistance to flow in the "low resistance" direction. An annular collar 68 protrudes into the cylindrical volume 24. In addition, the duct 28 is of smaller diameter than in the vortex diode of FIG. 1. It will be appreciated, by one skilled in the art, that changes may be made to the protrusion of the collar 68, and to the diameters of the two ducts 26 and 28, so as to tailor the flow resistance of the vortex diode in both directions to suit particular applications.

FIG. 9 shows a bearing chamber having a venting arrangement, according to an alternative aspect of the invention, which comprises two vortex diodes in flow series. Conduit 52 links the bearing chamber 50 to the tangential port 70 of a first vortex diode 72. Conduit 74 links the coaxial port 76 of the first vortex diode 72 to the coaxial port 78 of a second vortex diode 80. Conduit 82 links the tangential port 84 of the second vortex diode 80 to a region 62 outside the bearing chamber 50.

In normal operation, when the pressure in the bearing chamber 50 is lower than the pressure in the region 62, there will be a flow of air from the region 62 into the bearing chamber 50. Air will therefore flow into the second vortex diode 80 via its tangential port 84, and out through its coaxial port 78. It will be apparent that the air flow through the second vortex diode 80 will therefore be substantially as shown by the arrows 40, 42 and 44 in FIGS. 3 and 4, and that the resistance to flow will be relatively high. Furthermore, any oil entrained in the air flow will tend to be separated out by centrifugal force. The air will subsequently flow through the conduit 74 and through the first vortex diode 72, entering through the coaxial port 76 and exiting through the tangential port 70. The air flow through the first vortex diode 72 will therefore be substantially as shown by arrows 30 and 32 in FIGS. 1 and 2, and the resistance to flow will be relatively low.

In the converse case, where the pressure in the bearing chamber 50 is higher than the pressure in the region 62, the flow of air will be from the bearing chamber 50 into the region 62. It will be apparent that the flow of air through each of the first and second vortex diodes will be reversed. Consequently the first vortex diode 72 will now offer a relatively high resistance to flow, and any oil entrained in the air flow will tend to be separated out by centrifugal force; the second vortex diode 80 will offer a relatively low resistance to flow. Thus, this venting arrangement will offer a relatively high resistance to flow in both directions, while still permitting the centrifugal separation of any oil entrained in the air flow.

It will be appreciated, by one skilled in the art, that this arrangement could be further refined by tailoring the flow characteristics of the first and second vortex diodes (as discussed with reference to FIG. 8) to obtain various combinations of flow characteristics in the two directions The venting arrangement is shown attached to the side of the bearing chamber. However, it is envisaged that it could equally well be integrated into the structure of the bearing chamber, or alternatively be entirely separate from the bearing chamber and mounted elsewhere within the engine.

It will be appreciated that the two vortex diodes may be arranged differently in relation to each other, provided that their coaxial ports are always linked together, without affecting the operation of the venting arrangement.

FIG. 10 shows a bearing chamber having a venting arrangement according to a further aspect of the invention, comprising three vortex diodes arranged in flow series.

Conduit 52 links the bearing chamber 50 to the tangential port 54 of a first vortex diode 56. A conduit 57 links the coaxial port 60 of the first vortex diode 56 to the tangential port 54 of a second vortex diode 56. A further conduit 57 links the coaxial port 60 of the second vortex diode to the tangential port 54 of a third vortex diode 56, in like manner. Conduit 58 links the coaxial port 60 of the third vortex diode 56 to a region 62 outside the bearing chamber 50.

Under normal operating conditions, when the pressure within the bearing chamber 50 is less than the pressure in the region 62 outside the bearing chamber 50, air will flow from the region 62, through the conduit 58, then successively through the three vortex diodes 56, entering each in turn through its coaxial port 60 and exiting through its tangential port 54. Within each vortex diode 56, then, the flow of air will be substantially as shown by the arrows 30 and 32 in FIGS. 1 and 2, and the resistance to flow through each vortex diode 56 will be relatively low.

In the converse case, when the pressure within the bearing chamber 50 is greater than the pressure in the region 62, air will flow out of the bearing chamber 50, through the conduit 52, then successively through the three vortex diodes 56, entering each in turn through its tangential port 54 and exiting through its coaxial port 60. Within each vortex diode 56, then, the flow of air will be substantially as shown by the arrows 40, 42 and 44 in FIGS. 3 and 4, and the resistance to flow will be relatively high. In addition, any oil entrained in the air flow can be separated out by centrifugal force in any of the three vortex diodes, thus giving a more effective separation than in the embodiment having only one vortex diode.

The venting arrangement is shown attached to the side of the bearing chamber. However, it is envisaged that it could equally well be integrated into the structure of the bearing chamber, or alternatively be entirely separate from the bearing chamber and mounted elsewhere within the engine.

It will be appreciated that the three vortex diodes may be arranged differently in relation to each other, provided that the ports of the successive vortex diodes are always connected in the manner shown in FIG. 10, without affecting the operation of the venting arrangement.

Although this aspect of the invention has been described with reference to three vortex diodes, it will be appreciated by those skilled in the art that other numbers of vortex diodes could equally well be used.

It will be appreciated that it would also be possible for each of the vortex diodes to have different flow characteristics (as discussed in connection with FIG. 8), for example to optimize the oil separation.

I claim:

1. A bearing chamber including a vent, the vent including a vortex diode defining a chamber having a central axis and a peripheral wall surrounding said central axis, said peripheral wall including a conduit, said chamber defining a first flow path and a second flow path, in which fluid is able to flow through the chamber along either the first flow path or the second flow path, in which the resistance to fluid flow is relatively high when the fluid follows the first flow path and the resistance to fluid flow is relatively low when the fluid follows the second flow path wherein a wall is provided and spaced inwardly of said peripheral wall to provide an axially extended chamber by said peripheral wall to receive a higher density component separated from the fluid and for passing the higher density component back to the bearing chamber through said conduit.

2. A bearing chamber as claimed in claim 1, in which the first flow path is associated with fluid flow in one direction through the chamber, and the second flow path is associated with fluid flow in the opposite direction through the chamber.

3. A bearing chamber as claimed in claim 1, wherein the vortex diode defines two ports, the two ports being in fluid communication with the chamber and lying in planes substantially perpendicular to each other.

4. A bearing chamber as claimed in claim 3, in which the chamber is substantially cylindrical.

5. A bearing chamber as claimed in claim 4, in which one of the two ports is substantially coaxial with the chamber and the other of the two ports is substantially tangential to the chamber.

6. A bearing chamber as claimed in claim 5, in which the inner profile of the substantially tangential port is convergent.

7. A bearing chamber as claimed in claim 5, in which the inner profile of the substantially tangential port is convergent-divergent.

8. A bearing chamber as claimed in claim 1, in which the higher density component comprises a lubricant.

9. A gas turbine engine including a bearing chamber as claimed in claim 1.

10. A bearing chamber as claimed in claim 1, in which the vortex diode comprises a coaxial port, and in which an annular wall member protrudes generally axially from the coaxial port into the cylindrical volume of the vortex diode.

11. A bearing chamber venting arrangement according to claim 1, incorporating two vortex diodes, each vortex diode comprising a coaxial port, in which the two vortex diodes are arranged in flow series by connecting their coaxial ports.

12. A bearing chamber venting arrangement according to claim 1, incorporating a plurality of vortex diodes, each vortex diode comprising a tangential port and a coaxial port, in which the plurality of vortex diodes are arranged in flow series by connecting the coaxial port of each diode to the tangential port of the succeeding diode.

\* \* \* \* \*